US009518405B2

(12) United States Patent
Hull (10) Patent No.: US 9,518,405 B2
(45) Date of Patent: *Dec. 13, 2016

(54) MULTI-PURPOSE GRASPING ATTACHMENT ACCESSORY

(71) Applicant: Curtis Hull, Clarinda, IA (US)

(72) Inventor: Curtis Hull, Clarinda, IA (US)

(*) Notice: Subject to any disclaimer, the term of this patent is extended or adjusted under 35 U.S.C. 154(b) by 93 days.

This patent is subject to a terminal disclaimer.

(21) Appl. No.: 14/184,774

(22) Filed: Feb. 20, 2014

(65) Prior Publication Data

US 2015/0047862 A1 Feb. 19, 2015

Related U.S. Application Data

(63) Continuation-in-part of application No. 13/968,911, filed on Aug. 16, 2013.

(51) Int. Cl.
*E04H 17/26* (2006.01)
*A01G 23/06* (2006.01)
*A01G 17/16* (2006.01)

(52) U.S. Cl.
CPC ............ *E04H 17/265* (2013.01); *A01G 17/16* (2013.01); *A01G 23/065* (2013.01)

(58) Field of Classification Search
CPC .... A01G 23/06; A01G 23/062; A01G 23/065; A01G 17/16; E02F 3/404; B25J 15/103; E04H 17/265
See application file for complete search history.

(56) References Cited

U.S. PATENT DOCUMENTS

| 3,074,447 | A | * | 1/1963 | Bombardler | 144/3.1 |
| 3,163,458 | A | * | 12/1964 | Brandt, Jr. | 294/197 |
| 3,163,944 | A | * | 1/1965 | Whitcomb | 111/101 |
| 3,289,865 | A | * | 12/1966 | Hamilton et al. | 414/537 |
| 3,311,350 | A | * | 3/1967 | Irwin | 254/132 |
| 3,333,717 | A | * | 8/1967 | Scaperotto | 414/741 |
| 3,460,329 | A | * | 8/1969 | Overstreet, Jr. | 56/340.1 |
| 3,643,920 | A | * | 2/1972 | Widegren et al. | 254/124 |
| 3,646,976 | A | * | 3/1972 | McColl | 144/242.1 |
| 3,747,651 | A | * | 7/1973 | Bangert et al. | 144/34.2 |
| 3,834,560 | A | * | 9/1974 | Miller | 414/23 |
| 3,911,981 | A | * | 10/1975 | Tucek | 144/34.5 |
| 3,937,340 | A | * | 2/1976 | Grove | 414/740 |
| 3,974,925 | A | * | 8/1976 | McKenzie | 414/23 |
| 4,056,134 | A | * | 11/1977 | Bakowski | 144/24.13 |
| 4,111,245 | A | * | 9/1978 | McCrary et al. | 144/24.13 |
| 4,176,696 | A | * | 12/1979 | Greeninger | 144/4.6 |
| 4,254,608 | A | * | 3/1981 | Friday | 56/340.1 |
| 4,355,476 | A | * | 10/1982 | Engkvist | 37/406 |
| 4,483,379 | A | * | 11/1984 | Aikins et al. | 144/366 |

(Continued)

*Primary Examiner* — Jamie L McGowan
(74) *Attorney, Agent, or Firm* — McKee, Voorhees & Sease, PLC (57) ABSTRACT

The present invention relates in general to grasping accessories for utility tractors, particularly, for hydraulically-operated front end loader attachments for skid loaders. The purpose of the invention is to provide a multi-purpose accessory that protects an operator from loose debris while allowing the operator to remain in the tractor cab while grasping, pulling, and/or lifting bulky objects that would normally require the operator to step away from the cab or request the assistance of one or more persons. Such objects may include planted trees, bushes, or posts that require removal from the soil and transportation for disposal.

20 Claims, 7 Drawing Sheets

(56) References Cited

U.S. PATENT DOCUMENTS

| | | | | |
|---|---|---|---|---|
| 4,718,816 A | * | 1/1988 | King | 414/739 |
| 4,775,276 A | * | 10/1988 | McMillan | 414/23 |
| 4,805,676 A | * | 2/1989 | Aikins | 144/4.6 |
| 5,004,026 A | * | 4/1991 | MacLennan et al. | 144/4.1 |
| 5,174,701 A | * | 12/1992 | Small | 410/47 |
| 5,438,772 A | * | 8/1995 | Mieger | 37/406 |
| 5,471,747 A | * | 12/1995 | Morikawa | B23D 35/001 |
| | | | | 144/34.5 |
| 5,516,174 A | * | 5/1996 | Squyres | 294/86.41 |
| 5,516,250 A | * | 5/1996 | Sawyer | 414/23 |
| 5,765,349 A | * | 6/1998 | Michelson | 56/328.1 |
| 5,822,893 A | * | 10/1998 | Ostermeyer | 37/406 |
| 6,010,294 A | | 1/2000 | Lyddon | |
| 6,267,544 B1 | * | 7/2001 | Neville | 414/23 |
| 6,308,440 B1 | * | 10/2001 | Mueller | 37/404 |
| 6,357,993 B1 | * | 3/2002 | Burton | 414/724 |
| 6,592,316 B2 | * | 7/2003 | Hensler | 414/23 |
| 7,198,312 B2 | * | 4/2007 | Blaho | 294/106 |
| 8,544,946 B2 | * | 10/2013 | Holden | 297/197 |
| 8,561,325 B1 | * | 10/2013 | Hegener et al. | 37/301 |
| 2014/0132018 A1 | * | 5/2014 | Claffee et al. | 294/192 |
| 2015/0042116 A1 | * | 2/2015 | Jacobson | 294/197 |

\* cited by examiner

MULTI-PURPOSE GRASPING ATTACHMENT ACCESSORY

CROSS REFERENCE TO RELATED APPLICATIONS

This application is a Continuation-in-Part of U.S. patent application Ser. No. 13/968,911 filed Aug. 16, 2013, herein incorporated by reference in its entirety.

FIELD OF THE INVENTION

The present invention relates in general to grasping attachment accessories for utility tractors, particularly, to hydraulically-operated front end loader attachments for skid-steer loaders. The purpose of the invention is to provide a multi-purpose attachment accessory that protects an operator from debris and allows the operator to remain in the tractor cab while grasping, pulling, and/or lifting bulky objects that would normally require the operator to step away from the cab or request the assistance of one or more persons.

BACKGROUND OF THE INVENTION

Smaller than a conventional tractor, a skid-steer loader or skid loader is widely used in the construction, ranching, and farming industries because of its modest size, maneuverability in tight spaces, and lower cost. A skid loader is a rigid frame, engine powered machine with lift arms typically attached to a conventional bucket. However, the bucket may be exchanged with a wide variety of labor-saving tools or attachments powered by the skid loader's hydraulic system. Such skid loader attachments include, for example, backhoes, hydraulic breakers, pallet forks, angle brooms, sweepers, augers, mowers, snow blowers, stump grinders, tree spades, trenchers, dumping hoppers, rippers, tillers, grapplers, tilters, rollers, snow blades, wheel saws, cement mixers, and wood chippers. Newer skid loaders have a connection for external hydraulic systems, so that hydraulics on the attached equipment can be connected readily to the loader's hydraulic system.

Though sometimes equipped with tracks, skid loaders usually are four wheel drive vehicles with the left-side drive wheels independent of the right-side drive wheels. By having each side independent of the other, wheel speed and direction of rotation of the wheels determine the direction the skid loader will turn. Skid loaders are capable of zero-radius, "pirouette" turning, which makes them extremely maneuverable and valuable for jobs that require a compact, agile loader. Moreover, skid loaders may be operated by one user where steering is controlled by two hand levers and attachments are simultaneously operated by foot pedals.

Currently, large bulldozers, tractors, or backhoes are typically required for removing posts, trees, and shrubs deeply rooted into the ground. Such operations are time consuming, awkward, and may require more than one person. For example, an operator will typically drive up to the unfortunate tree, step out of the tractor, wrap a heavy logging chain around the tree trunk, attach the logging chain to the loader of the tractor, climb back into the tractor, and then—hopefully—remove the tree by lifting the loader. Otherwise, two persons are utilized to save time. In this instance, the operator remains in the cab of the tractor and the second person attaches and removes the logging chain around the tree, shrub, or post. Notably, this method is only useful for removing small trees, shrubs, and posts in wide open spaces where a tractor, bulldozer, or backhoe has freedom to maneuver. In addition, the large machinery is very expensive.

Furthermore, there are a number of attachments for skid loaders that enable them to accomplish a number of functions. One attachment mechanism is a clamping mechanism known as a "grapple." A grapple is typically a hydraulically operated clamp, which includes pivotal jaws extending across the front of the skids steer loader. In most such grapples, the jaws are opened by a pair of spaced hydraulic cylinders. A problem with grapples of this nature is that they do not protect the operator of the skid loader from loose debris while removing posts, trees, and shrubs deeply rooted into the ground.

Thus, what is needed is a tree, shrub, and/or post removing attachment for smaller machinery, such as a skid loader, that can fit in tight places, be highly maneuverable, and allow a single user to operate. What is also needed is an attachment that has the ability to remove trees, shrubs, and posts quickly, conveniently, and to lift other heavy objects as well. What is further needed is an accessory comprising a grapple for the attachment that fits through narrow openings, has improved construction for picking up a variety of objects, and protects the operator of the skid loader from loose debris while transporting objects.

BRIEF SUMMARY OF THE INVENTION

Therefore, it is a principal object, feature, and/or advantage of the present invention to overcome the aforementioned deficiencies in the art and provide a multi-purpose attachment accessory that can be easily attached to and removed from a utility tractor, particularly, to a skid loader, and its hydraulic system.

Another object, feature, and/or advantage of the present invention is to provide a multi-purpose attachment to a utility tractor that is capable of grasping, lifting, pulling, picking up, holding, loading, and transporting large heavy objects.

Yet another object, feature, and/or advantage of the present invention is to provide a multi-purpose attachment to a utility tractor that is attached to the front of the utility tractor for easy visibility to the operator.

A further object, feature, and/or advantage of the present invention is to provide a multi-purpose attachment to a utility tractor that has the ability to remove trees, shrubs, and posts quickly and easily.

Another object, feature, and/or advantage of the present invention is to provide an accessory for the multi-purpose attachment to a utility tractor that has the ability to grapple and transport large heavy objects when used in concert with the attachment.

A still further object, feature, and/or advantage of the present invention is to provide a multi-purpose attachment to a utility tractor that only requires one user to operate without requiring the user to step away from the cab of the utility tractor.

Another object, feature, and/or advantage of the present invention is to provide a multi-purpose attachment to a utility tractor that allows for high maneuverability in tight places.

Yet another object, feature, and/or advantage of the present invention is to provide a method of removing trees, shrubs, and posts quickly and easily.

A further object, feature, and/or advantage of the present invention is to protect the operator of the skid loader from loose debris while removing posts, trees, and shrubs deeply rooted into the ground.

Another object, feature, and/or advantage of the present invention is to provide an accessory for the attachment that assists in grasping, lifting, pulling, picking up, holding, loading, and transporting large heavy objects while protecting the operator of a skid loader from loose debris.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a multi-purpose attachment to a utility tractor is provided. The multi-purpose attachment comprises a frame that fits onto the loader arms on the front of the skid loader via at least one attachment section. The frame serves as a platform upon which a pair of jaw members can be employed to grasp, lift, pull, pick up, hold, load, and transport large, heavy objects. One of the jaw members is pivotally mounted on the frame and hydraulically driven by a jaw actuator assembly, while the remaining jaw member is fixedly mounted on the frame at an angle, preferably between 45-85° relative to the frame. The object sought to be grasped is positioned between the jaw members. Such positioning can be accomplished by moving the skid loader close to the object and utilizing a tilting motion of conventional skid loader arms. Through movement of the pivotally mounted jaw member, the jaw members are capable of maintaining a closed position upon the object for grasping, and an open position for releasing the object. This design produces unexpected results in that the fixed jaw member increases the stability and strength of the attachment while grasping and transporting objects, while the angle of the fixed jaw member allows larger objects to be grasped. A hydraulic connection, typically comprising hydraulic hoses, is further utilized to connect the jaw actuator assembly to the external hydraulic system of a skid loader to allow the operator to control the jaw actuator assembly. A cab guard can be further attached to the frame to protect the cab and operator of the skid loader from stray limbs, branches, or other objects while the attachment is grasping, lifting, and transporting such objects.

This design enables a single operator of the utility tractor, such as a skid loader, to lift and move heavy objects that would normally require two or more persons to accomplish. This is all accomplished easily and conveniently without the operator leaving the cab of the skid loader. Furthermore, the angle of the jaw members enables irregular objects, in addition to large trees, shrubs, and posts, to be grasped, lifted, and transported. Utilizing the tilting motion of conventional tractor arms, additional torque can be applied to increase the lifting force of the attachment. For example, jaw members may be positioned around and near the base of a tree trunk, which may be eight inches or more in diameter. Upon closing the jaw members, the tractor arms may be tilted to apply extra leverage against the ground while simultaneously lifting the tree. Such approaches can be utilized to grasp and lift a variety of heavy objects by the present invention.

According to a further aspect of the present invention, an accessory for the multi-purpose attachment to a utility tractor is provided. The accessory comprises a crossbar fixedly yet removably attached to the frame of the multi-purpose attachment. The crossbar supports a grapple comprising a plurality of tines and a protective see-through shield. The grapple is pivotally attached to the crossbar and includes a hydraulic actuator for rotating the grapple between an open raised state and a closed lowered state with respect to the jaw members of the multi-purpose attachment. The hydraulic actuator is preferably a single hydraulic drive cylinder that is inexpensive and easily replaceable. A hydraulic connection, typically comprising hydraulic hoses, is further utilized to connect the accessory to the external hydraulic system of a skid loader to allow the operator to control the accessory. This design produces unexpected results in that the jaw members of the multi-purpose attachment when used in combination with the grapple increases the ability of the skid loader to grasp and transport unwieldy objects. Furthermore, when in the raised state, the shield of the grapple acts as a cab guard to protect the cab and operator of the skid loader from stray limbs, branches, or other objects while the attachment is grasping, lifting, and transporting such objects.

According to another aspect of the present invention, a method of removing trees, shrubs and/or posts quickly and easily is provided. The method includes providing a multi-purpose attachment to a utility tractor, such as a skid loader. The multi-purpose attachment comprises a frame that fits onto the loader arms on the front of the skid loader, a pair of jaw members attached to the frame, a jaw actuator assembly, and a hydraulic connection. One of the jaw members is pivotally mounted on the frame and hydraulically driven by the jaw actuator assembly, while the remaining jaw member is fixedly mounted on the frame at an angle, preferably between 45-90° relative to the frame, and more preferably between 60-80°. The hydraulic connection typically comprises hydraulic hoses utilized to connect the jaw actuator assembly to the external hydraulic system of a skid loader to allow an operator to control the jaw actuator assembly. The method further includes actuating the jaw members into an open position. The method includes positioning the tree, shrub, or post between the jaw members in the open position by moving the skid loader close to the tree, shrub, or post and utilizing the tilting motion of conventional skid loader arms. The jaw members are then transitioned into a closed position, wherein the jaw members close tightly upon the tree, shrub, or post for grasping. The method further includes raising the conventional skid loader arms to remove the tree, shrub, or post from the ground. The tree, shrub, or post is then transported to the desired location by moving the skid loader, wherein the jaw members are finally actuated into the open position for releasing the object.

According to a further aspect of the present invention, a method of removing trees, shrubs and/or posts quickly and easily is provided. The method includes providing an accessory coupled to a multi-purpose attachment for a utility tractor, such as a skid loader. The multi-purpose attachment comprises a frame that fits onto the loader arms on the front of the skid loader, a pair of jaw members attached to the frame, a jaw actuator assembly, and a hydraulic connection. One of the jaw members is pivotally mounted on the frame and hydraulically driven by the jaw actuator assembly, while the remaining jaw member is fixedly mounted on the frame at an angle, preferably between 45-90° relative to the frame, and more preferably between 60-80°. The accessory comprises a crossbar fixedly yet removably attached to the frame of the multi-purpose attachment. The crossbar supports a grapple comprising a plurality of tines and a protective see-through shield. The grapple is pivotally attached to the crossbar and includes a hydraulic actuator for rotating the grapple between an open raised state and a closed lowered state with respect to the jaw members of the multi-purpose attachment. The hydraulic actuator is preferably a single hydraulic drive cylinder that is inexpensive and easily replaceable. A hydraulic connection, typically comprising hydraulic hoses, is further utilized to connect the jaw actuator assembly and the accessory to the external hydraulic system of a skid loader to allow the operator to control the accessory and jaw actuator. The method further includes actuating the jaw members into an open position and the grapple into the open raised state. The method includes positioning the tree, shrub, or post between the jaw members in the open position by moving the skid loader close to the tree, shrub, or post and utilizing the tilting motion of conventional skid loader arms. The jaw members are then transitioned into a closed position, wherein the jaw members close tightly upon the tree, shrub, or post for grasping. The method further includes transitioning the grapple into a closed lowered state. The method further includes raising the conventional skid loader arms to remove the tree, shrub, or post from the ground. The tree, shrub, or post is then transported to the desired location by moving the skid loader, wherein the grapple is transitioned into the open raised state and the jaw members are finally actuated into the open position for releasing the object.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIGS. 1-9 represent examples of multi-purpose attachments and accessories of the present invention.

DETAILED DESCRIPTION OF THE INVENTION

Figure 1:
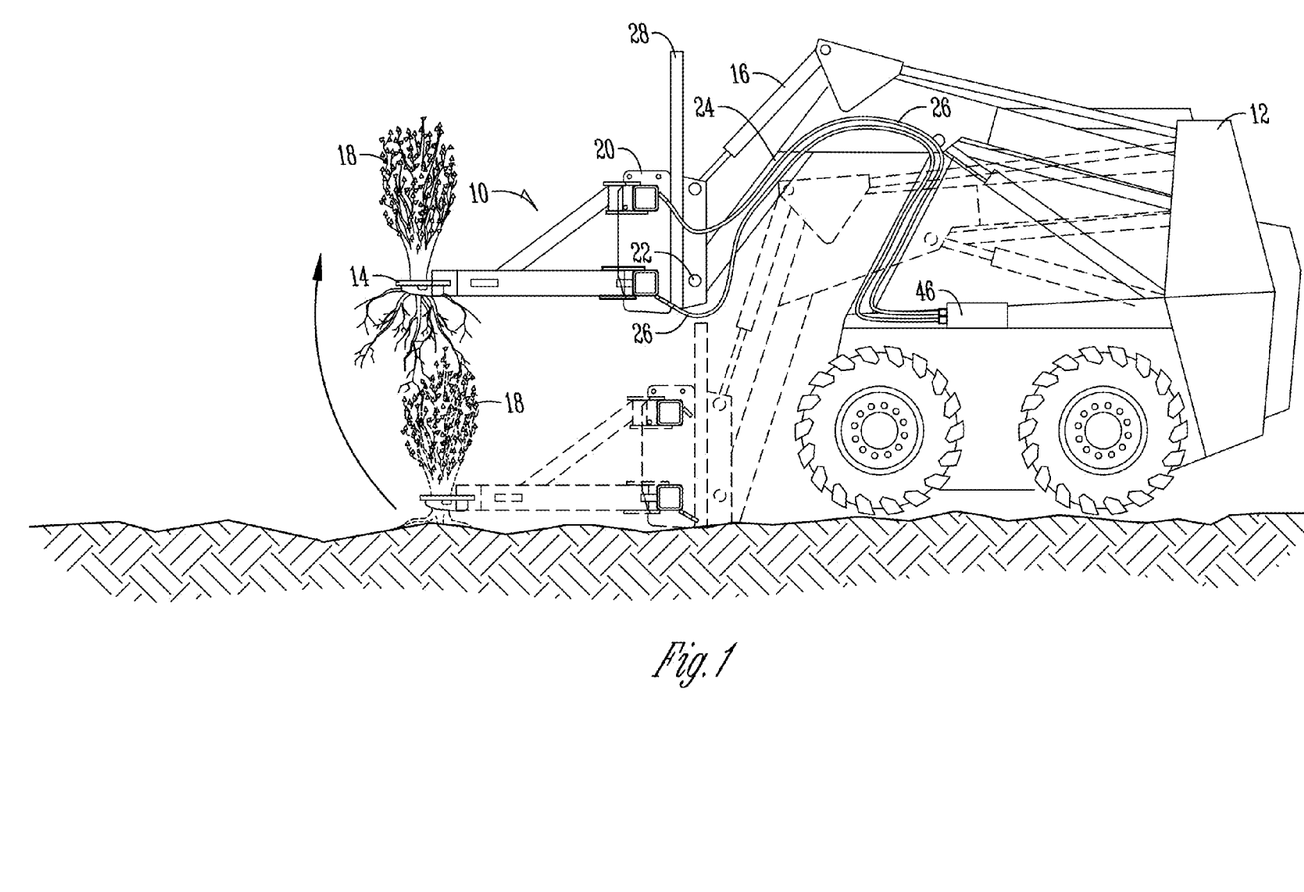
FIG. 1 an overall perspective view of the present invention attached to a skid loader.

The present invention provides an attachment 10 and an accessory 5555 for utility tractors, particularly, to hydraulically-operated front end loader attachments for skid loaders. Such attachments are capable of grasping and lifting a heavy object, moving it to a new location, and setting it down without the skid loader operator leaving the cab of the skid loader. The object may be simply or oddly shaped, and it may be moved to a location that requires it to be lifted over a barrier like a wall. Trees, bushes, or fence posts can be pulled from the ground and moved to a rubble or debris bin for hauling. Accordingly, FIG. 1 shows an embodiment of a grasping attachment 10 attached to a conventional skid loader 12. Other vehicles can also be used, including track-type skid loaders or tractors. The unique configuration of the attachment 10 that is pivotally mounted on the loader arms 24 of the skid loader 12 at a pivotal mount and via actuators 16, allows the attachment 10 to be tilted during use. Using conventional skid loader operation, the attachment 10 can be tilted forward to grab, for example, a shrub 18, close to, at, or just beneath the ground surface. When this motion is reversed to raise or lift the shrub, the skid loader causes the jaw members 14 to tilt back, thus providing torque to the shrub being lifted. In addition, tilting the attachment 10 forward slightly when grasping the shrub 18 allows the jaw members 14 to be driven into the ground as the skid loader 12 is moved forward. This enables jaw members 14 to be positioned as low as possible under the shrub 18, or other object, for removal. It also maximizes the lifting force when the attachment 10 is used to uproot shrubs, trees, or to pull posts from the ground.

The weight of the object that can be lifted depends on the nature of the skid loader used, for example the rated lifting capacity, and the heft with which the inventive tool is manufactured. The skid loader may be manufactured from lighter or heavier materials depending on the strength characteristics required. While the lifting force of a skid loader may be rated at about 1,700 lbs., however, by tilting the attachment the application of torque maximizes the lifting force applied to the object.

The attachment 10 is easily attached to and detached from the skid loader 12. In the embodiment shown in FIGS. 1-5, a frame 20 of the attachment 10 is attached to skid loader arms 24 using at least one attachment section 22. In other embodiments, the attachment 10 may be attached in a conventional fashion using a single attachment section, for example, via a post or rod connection in the middle of frame 20. Tilt can be controlled by at least one actuator 16 on skid loader 12. Other suitable conventional attachment mechanisms generally well known to practitioners in this art may also be utilized. Additionally, at least one jaw actuator connection 26, typically comprising hydraulic hoses with corresponding hydraulic couplings, connect attachment 10 to the external hydraulic system 46 of skid loader 12 for providing power and operational control. An optional cab guard 28 may also be attached onto frame 20 (e.g., via welds or bolts) for protecting the cab of the skid loader 12 and operator from stray limbs, branches, or other objects during grasping, lifting, and transportation.

Figure 2:
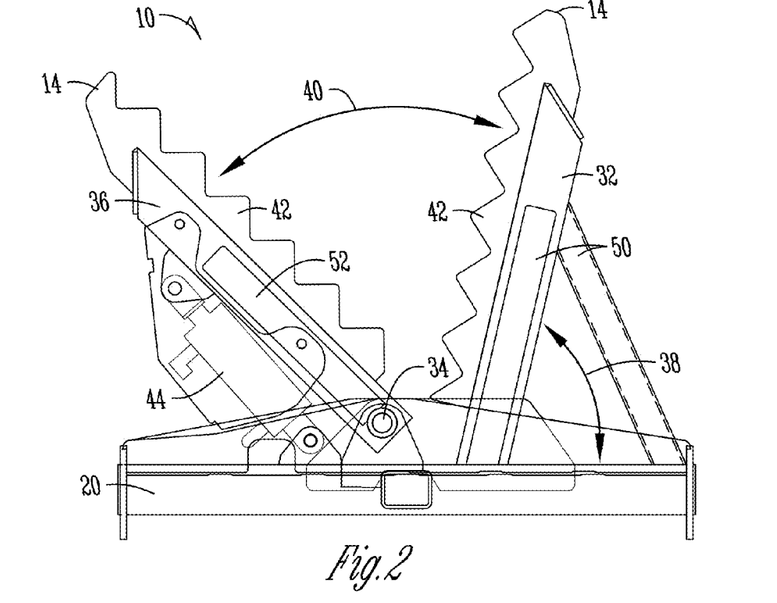
FIG. 2 is a top plan view of the invention of an attachment wherein the jaw members are in an open position.

FIG. 2 is a view of one aspect of a grasping attachment 10 of the present invention for a utility tractor, such as a skid loader, wherein the jaw members 14 are in an open position. The attachment 10 comprises a frame 20, wherein the frame 20 is made from any number of materials strong enough to support the jaw members 14. Preferably, the frame 20 comprises metal, and most preferably, continuously welded steel. The attachment 10 further comprises at least one attachment section 22 on the frame 20 that fits onto the loader arms 24 located towards the front of the skid loader 12. A fixed jaw member 32 is fixedly attached to the frame 20, wherein the fixed jaw member 32 does not pivot, rotate, or otherwise move in relation to the frame 20. Moreover, the fixed jaw member 32 is fixedly mounted on the frame 20 at an angle 38, for example between 45-90°, and more preferably between 60-80°. At least one fixed reinforcing member 50, preferably two, is fixedly attached to the frame 20 and the fixed jaw member 32, forming a triangle support that provides increased strength and stability to the fixed jaw member 32. Similar to the fixed jaw member 32, the fixed reinforcing member 50 also does not pivot or move in relation to the frame 20. This inventive design, incorporating the fixed jaw member 32 supported by at least one fixed reinforcing member 50, produces unexpected results in increased strength and stability of the attachment 10 while grasping and transporting objects. Furthermore, the particular angle of the fixed jaw member 32 in relation to the frame 20 allows larger objects to be grasped and transported. For example, it is contemplated that trees approximately eight inches or more in diameter may be removed with use of the attachment 10 of the present invention.

As further illustrated in FIG. 2, a pivotal jaw member 36 is pivotally mounted on the frame 20 and opposite the fixed jaw member 32. The pivotal jaw member 36 may be pivotally mounted on the frame 20 by a first rod 34, or other similar mechanisms recognized by those of ordinary skill in the art. In the open position, the pivotal jaw member 36 is in a common plane with the fixed jaw member 32 and forms an angle 40. The angle 40 is variable, and can extend up to or greater than 90° between the pivotal jaw member 36 and the fixed jaw member 32. This particular angular range allows the attachment 10 to grasp larger objects, such as tree trunks 6-8 inches (or more) in diameter between the jaw members 14. The pivotal jaw member 36 is supported by a pivotal reinforcing member 52 pivotally mounted to the frame 20 by a second rod 54 (see FIG. 4), or any similar mechanisms recognized by those of ordinary skill in the art. Pivotal jaw member 36 and pivotal reinforcing member 52 form a triangle shaped support that provides increased strength and stability to pivotal jaw member 36 during movement.

Both the pivotal jaw member 36 and fixed jaw member 32 comprise saw toothed inner grasping edges 42. Such saw toothed inner grasping edges 42 increase friction, prevent slippage, and help maintain control while the jaw members 14 grasp objects. Other geometrical forms may also be utilized for inner grasping edges (e.g., waves, paddles, teeth, or the like).

As is also illustrated best in FIG. 2, the attachment 10 further comprises a jaw actuator assembly 44 configured to move the pivotal jaw member 36 from a closed position (see FIG. 3) to the open position, and vice versa. While the jaw actuator assembly 44 of the present invention is shown to comprise two hydraulic cylinder assemblies, it should be appreciated that other means could be used such as electric or gasoline motors, cables and pulleys, or other means generally known by practitioners of ordinary skill in the art. The jaw actuator assembly 44 is connected at one end (proximal) to the frame 20 and at the other end (distal) to the pivotal jaw member 36. The jaw actuator assembly 44 is further connected to the external hydraulic system 46 (see FIG. 1) on the skid loader 12 via a jaw actuator connection 26. The jaw actuator connection 26 typically comprises at least one hydraulic hose, preferably two, and at least one hydraulic coupling, also preferably two. Thus, the skid loader 12 provides hydraulic power and enables the operator in the cab of the skid loader to operate and control the jaw actuator assembly 44 through the jaw actuator connection 26.

Figure 3:
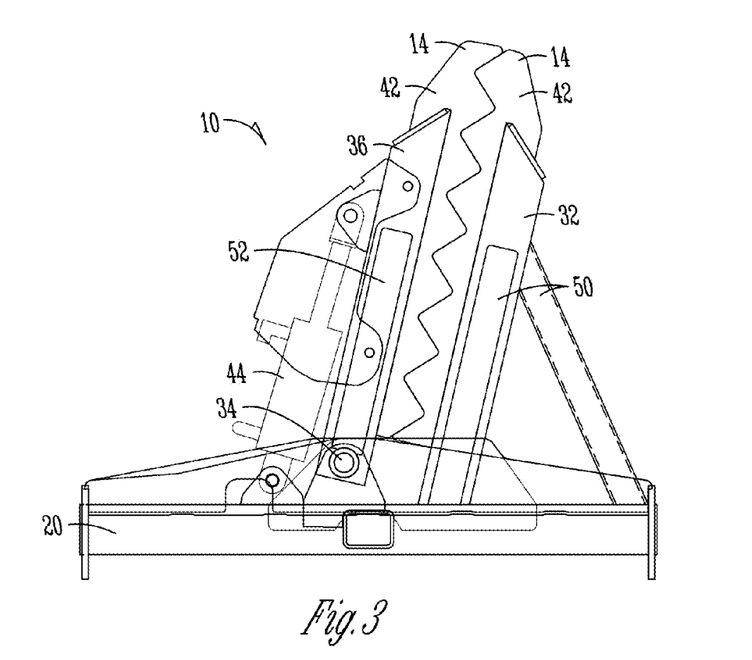
FIG. 3 is a top plan view of the invention of FIG. 2 wherein the jaw members are in a closed position.

FIG. 3 illustrates a top plan view of the attachment 10, wherein the jaw members 14 are in a closed position. In the closed position, the saw-toothed inner grasping edges 42 align to fit together. When grasping an object, such as a tree, bush, or post, the jaw actuator assembly 44 moves the pivotal jaw member 36 from the open position (see FIG. 2) to the closed position (see FIG. 3) in order to grasp the object in between the saw toothed inner grasping edge 42 of the pivotal jaw member 36 and the saw toothed inner grasping edge 42 of the fixed jaw member 32. Subsequently, the attachment 10, via the loader arms 24, applies sufficient force to remove the tree, shrub, or post from the ground.

Figure 4:
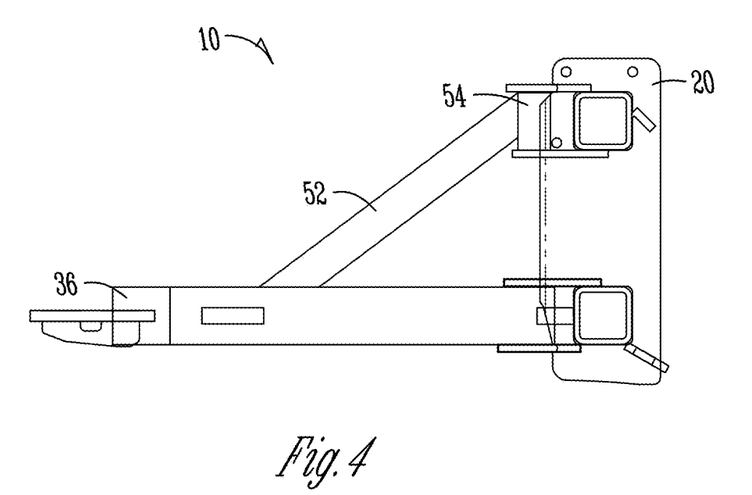
FIG. 4 is a side plan view of the invention of FIG. 2.
Figure 5:
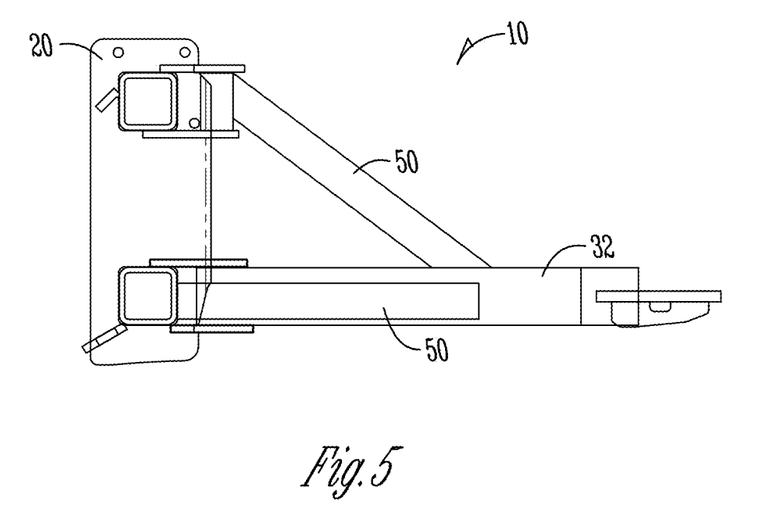
FIG. 5 is an opposing side plan view of the invention of FIG. 4.

FIGS. 4 and 5 illustrate side plan views of the attachment 10 according to embodiments of the present invention. In FIGS. 4 and 5, it is readily apparent that the pivotal jaw member 36 is in a common plane with the fixed jaw member 32. FIG. 4 shows that pivotal jaw member 36 is supported by the pivotal reinforcing member 52 pivotally mounted to the frame 20 by the second rod 54. The resulting triangle shaped support provides increased strength and stability to the pivotal jaw member 36 during movement. Likewise, FIG. 5 shows wherein at least one fixed reinforcing member 50, preferably two, is fixedly attached to the frame 20 and fixed jaw member 32 to form a triangle shaped support that provides increased strength and stability to the fixed jaw member 32. As mentioned previously, this inventive design produces unexpected results in increased strength and stability of the attachment 10 while grasping and transporting objects.

Figure 6:
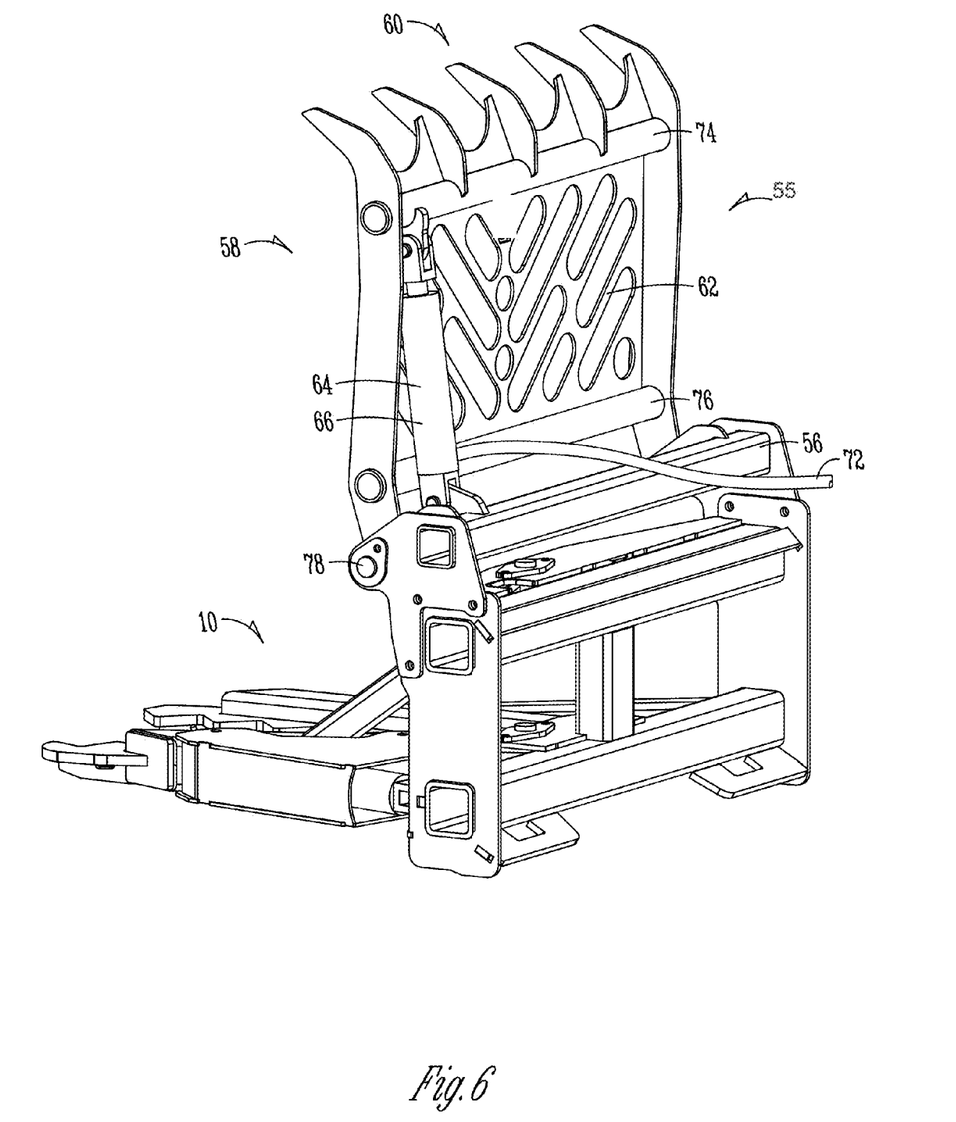
FIG. 6 is a side view of the accessory coupled to the multi-purpose attachment of FIG. 5.
Figure 7:
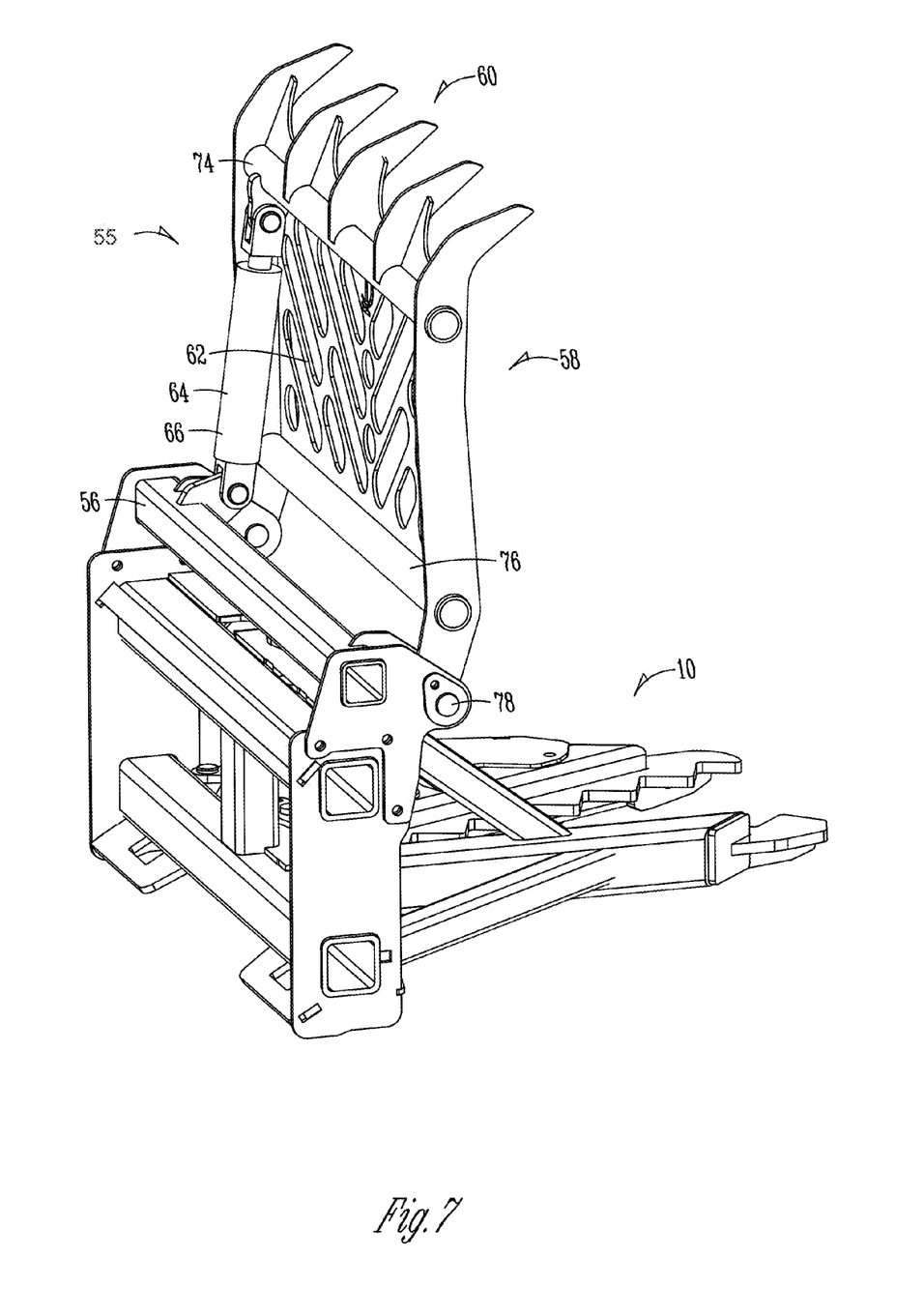
FIG. 7 is an opposing side view of the accessory coupled to the multi-purpose attachment of FIG. 6.

FIGS. 6 and 7 illustrate additional views of an accessory 55 coupled to the multi-purpose attachment 10 of the invention. The accessory 55 comprises a cross-bar 56 removably coupled or attached to the frame 20. The removable attachment may be means generally known by practitioners of ordinary skill in the art (e.g., apertures with pins, bolts and nuts, shafts, etc.). A grapple 58 comprising a shield 62, a plurality of tines 60, a first reinforcing bar 74 and a second reinforcing bar 76, is pivotally connected to the cross-bar 56 by means of a pivotal fitting 78. The plurality of tines 60 extend perpendicularly thereto from the first reinforcing bar 74. The plurality of tines 60 may be removably secured or permanently welded or otherwise affixed to the first reinforcing bar 74. The shield 62 is located between first reinforcing bar 74 and the second reinforcing bar 76. Moreover, the shield 62 preferably is made of metal that includes apertures to allow the operator to see through the shield 62 while operating the accessory 55 to assist in picking up objects with the accessory 55 and/or attachment 10. However, the shield 62 may also be formed of a strong, durable, see-though rigid material, such as plastic, Plexiglas®, or the like, that fulfills the same goals of protecting the cab of the skid loader while allowing the operator to see through the shield 62 during operation of the accessory 55 and/or attachment 10. A grapple actuator 64, preferably comprising a hydraulic cylinder 64, is connected at one end (proximal) to the cross-bar 56 and at the other end (distal) to the first reinforcing bar 74. While the present invention preferably comprises one hydraulic cylinder, it should be appreciated that more than one hydraulic cylinder may be used depending on the load requirements of the accessory 55. Furthermore, other actuator means could be also used such as electric linear actuators, pneumatic actuators, electric or gasoline motors, cables and pulleys, or other means generally known by practitioners of ordinary skill in the art. The grapple actuator 64 is further connected to the external hydraulic system 46 (see FIG. 1) on the skid loader 12 via a grapple actuator connection 68. The grapple actuator connection 68 typically comprises at least one hydraulic hose 72, preferably two, and at least one hydraulic coupling 70, also preferably two. Thus, the skid loader 12 provides hydraulic power and enables the operator in the cab of the skid loader to operate and control the grapple actuator 64 through the grapple actuator connection 68. It should be appreciates, that when electric actuators are used, the hose may be replaced with an electrical line from the tractor or another power source, such as a generator, to provide the electric power to the actuator.

It should be appreciated, that when both the attachment 10 and the accessory 55 are used with the same tractor, the attachment 10 may include first and second jaw members that both can be pivoted, and may also include situations in which a fixed jaw member is substantially perpendicular to the frame. While it may be beneficial to have the jaw members as shown and described, the invention should not be limited to those situations only, and it is to be included that any configuration of members be used.

Figure 8:
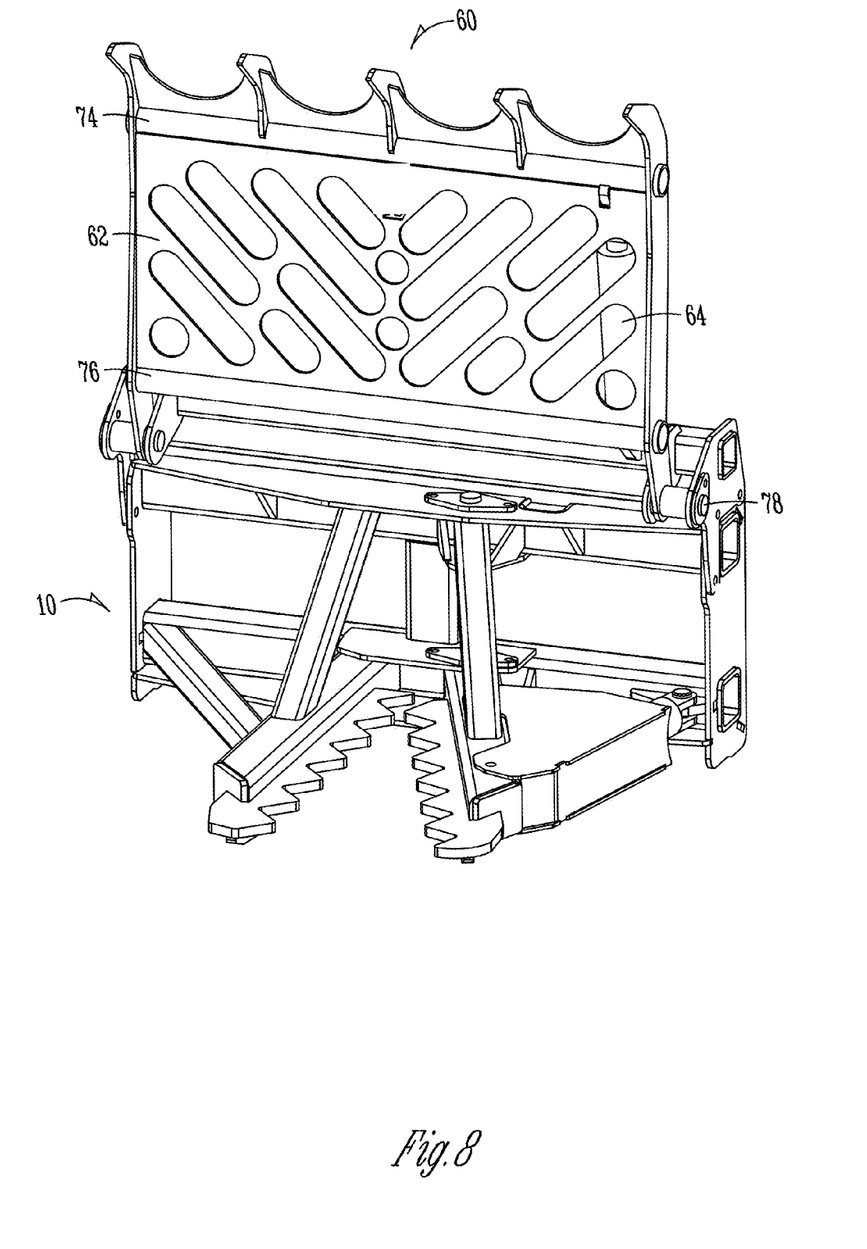
FIG. 8 is a front view of the accessory in the raised state coupled to the multi-purpose attachment of FIG. 7 wherein the jaw members are in an open position.
Figure 9:
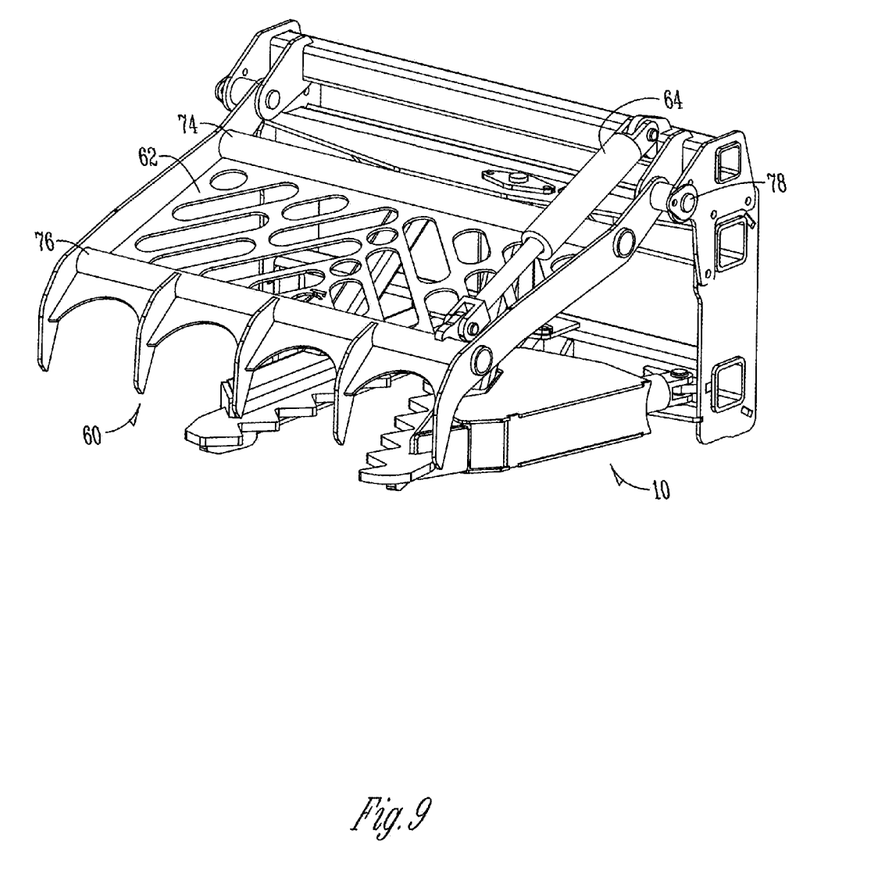
FIG. 9 is a front view of the accessory in the closed state coupled to the multi-purpose attachment of FIG. 8 wherein the jaw members are in the open position.

FIG. 8 illustrates the raised, open state of the accessory 55 of the present invention. Actuation of the hydraulic cylinder 66 of the grapple actuator 64 causes movement of the grapple 58 into a raised open state, which allows the operator to move the skid loader into position around the object to be grasped. The grapple actuator 64 is configured to move the grapple 58 from an open raised state (see FIG. 8) to a closed lowered state (see FIG. 9), and vice versa. When in the open raised state, the shield 62 of the grapple 58 also acts as a cab guard 28 for protecting the cab of the skid loader 12 and operator from stray limbs, branches, or other objects during grasping, lifting, and transportation. FIG. 9 illustrates the closed lowered state of the grapple 58 which allows the operator to further grasp objects between the attachment 10 and the grapple 58.

According to a still further aspect of the present invention, a method of removing trees, shrubs, or posts is provided. The method includes providing the multi-purpose grasping attachment for a utility tractor, such as a skid loader, as illustrated in FIGS. 1-5 and described supra. The method further includes providing an accessory 55 for the multi-purpose grasping attachment 10, as illustrated in FIGS. 6-9. The method includes actuating the pivotal jaw member 36 into an open position, as illustrated in FIG. 2. The jaw actuator assembly 44 is configured to move the pivotal jaw member 36 from a closed position (see FIG. 3) to the open position (see FIG. 2), and vice versa. The accessory 55 is actuated into an open raised state, as illustrated in FIG. 8. Next, a skid loader operator moves the skid loader 12 into position, wherein the tree, shrub, or post 18 is positioned between the jaw members 14 (e.g., between the saw toothed inner grasping edge 42 of the pivotal jaw member 36 and the saw toothed inner grasping edge 42 of the fixed jaw member 32). The jaw members 14 may be positioned around the base of the tree, shrub, or post 18 near or at the ground. The method further involves actuating the pivotal jaw member 36 into the closed position, as illustrated in FIG. 3, wherein the jaw members 14 close tightly upon and grasp the tree, shrub, or post 18. Notably, the saw toothed inner grasping edges 42 increase friction, prevent slippage, and help maintain control while the jaw members 14 grasp the object. Furthermore, the accessory 55 is actuated into a closed lowered state, as illustrated in FIG. 9, to close tightly upon the object to be grasped.

Subsequently, the skid loader operator raises the loader arms 24 of the skid loader 12 to apply sufficient force to remove the tree, shrub, or post 18 from the ground. This is shown in the solid and broken lines of FIG. 1, where the solid lines show the object 18 lifted out of the ground. While continuing to grasp the tree, shrub, or post 18 between the jaw members 14, the skid loader 12 is moved, thus, transporting the tree, shrub, or post 18 to a desired location (e.g. a rubble, burn pile, or debris bin for hauling). The grapple 58 of the accessory 55 is actuated into the open raised state (see FIG. 8), which allows the shield 62 to act as a cab guard for protecting the cab of the skid loader 12 and operator from stray limbs, branches, or other objects during grasping, lifting, and transportation. The pivotal jaw member 36 can then be actuated from the closed position (see FIG. 3) to the open position (see FIG. 2), to release the tree, shrub, or post 18 at the desired location.

EXAMPLE 1

A Bobcat® skid-steer loader, fitted with the present inventive multi-purpose grasping attachment, was used to clear shrubs from a field. The skid loader was driven up to a shrub, wherein the grapple 58 of an accessory 55 was actuated into the open raised state and the jaw members 14 were placed in an open position (see FIG. 2). The attachment 10 was tilted slightly downward, and lowered until the jaw members 14 were positioned at the ground or slightly beneath it. The shrub was positioned near the mid-point between jaw members 14. The jaw members 14 were then actuated into the closed position (see FIG. 3), thus, closing around shoots of the shrub. The attachment was next tilted upward and away from the ground raised by the skid loader arms 24. The shield 62 of the grapple 58 in the open raised state (see FIG. 8), acted act as a cab guard for protecting the cab of the skid loader 12 and operator from stray limbs, branches, or other objects. As a result, the shrub and its root system were lifted from the ground and ultimately deposited in a bin with other debris, all without the skid loader operator leaving the cab of the skid loader who was safely protected by the accessory 55 acting as a cab guard.

EXAMPLE 2

In a manner similar to that described in Example 1, trees—with tree trunks between approximately 6-8 inches in diameter—were removed from a grove or field. The entire tree, including canopy, trunk, and root system, was uprooted, moved to a disposal area, and deposited in a debris pile while protecting the skid loader operator from debris and leaving the cab of the skid loader.

EXAMPLE 3

Akin to Examples 1 and 2, multiple fence posts were quickly and easily removed from a field using the present inventive multi-purpose grasping attachment. A skid loader, fitted with the attachment 10 and accessory 55 was driven up to a fence post wherein the jaw members 14 were placed in the open position (see FIG. 2) and the grapple 58 was placed in the open raised state (see FIG. 8). The attachment 10 was lowered near the ground with the fence post positioned near the mid-point between the jaw members 14. The jaw members 14 were then actuated into the closed position (see FIG. 3), closing around the fence post. Raising the skid loader arms 24, the fence post was lifted from the ground safely because the shield 62 of the grapple 58 in the open raised state (see FIG. 8) acted act as a cab guard for protecting the cab of the skid loader 12 and operator from accidents while pulling the fence post out of the ground. The grapple 58 was then positioned in the lowered closed state (see FIG. 9) which assisted the attachment 10 in grasping and maintaining control over the fence post while transporting and depositing it into a wagon for removal, all without the skid loader operator leaving the cab of the skid loader.

The multi-purpose grasping attachment and accessory of the present invention and method of removing trees, shrubs, or posts, are universally applicable to utility tractors and skid-steer loaders of all shapes and sizes, makes, models, and manufacturers. Although the invention has been described and illustrated with respect to preferred aspects thereof, it is not to be so limited since changes and modifications may be made therein which are within the intended scope of the invention. According to additional embodiments, the number of tines may vary. For example, such tines may be spaced vertically apart, wherein such tines are spaced not coplanar and are staggered vertically relative to one another. In such cases the number of actuators may vary as well to accommodate independent control of a plurality of pivoting grapples.

What is claimed is:

1. A multi-purpose grasping attachment and accessory for a utility tractor, comprising:
    a frame;
    at least one attachment section on the frame for attaching the frame to the utility tractor;
    a pivotal jaw member pivotally mounted to the frame;
    a fixed jaw member fixedly attached to the frame and opposite the pivotal jaw member, said pivotal jaw member and said fixed jaw member oriented on a substantially horizontal plane;
    a pivotal reinforcing member pivotally mounted to the frame and fixedly attached to the pivotal jaw member;
    a jaw actuator assembly comprising one or more jaw hydraulic cylinders configured to move the pivotal jaw member relative to the fixed jaw member about a generally vertical axis between open and closed positions, said pivotal jaw member configured to move along a generally horizontal plane;
    wherein one of the one or more jaw hydraulic cylinder assemblies is operably connected to the pivotal reinforcing member and the frame;
    wherein the one or more jaw hydraulic cylinder assemblies are oriented to be generally parallel to the pivotal jaw member;
    wherein the fixed jaw member is angled less than 90° from the frame; and
    an accessory removably coupled to the frame and comprising:
        a) a cross-bar configured to be coupled to the frame;
        b) a grapple pivotally attached to the cross-bar, said grapple configured to pivot about a generally horizontal axis; and
        c) a grapple actuator configured to move the grapple as it pivots between an open raised state and a closed lowered state;
        d) said grapple comprising a see-through shield extending substantially the length of the cross-bar; and
        e) said grapple movable between an open position wherein the grapple is generally oriented to be perpendicular to the pivotal and fixed jaw members and a closed position wherein the grapple is generally oriented to be parallel to the pivotal and fixed jaw members, said grapple configured to decrease the space between the grapple and the jaw members when in the closed position.

2. The multi-purpose grasping attachment of claim 1, further comprising a jaw actuator connection connecting the jaw actuator assembly to the utility tractor for operating and powering the jaw actuator assembly and a grapple actuator connection connecting the accessory to the utility tractor for operating and powering the grapple actuator.

3. The multi-purpose grasping attachment of claim 2, wherein the fixed jaw member is separately supported by two fixed reinforcing member fixedly attached to the frame, wherein the at least one fixed reinforcing member does not pivot or move in relation to the frame.

4. The multi-purpose grasping attachment of claim 3, wherein the pivotal jaw member is pivotally mounted to the frame by a first rod and the pivotal reinforcing member is pivotally mounted to the frame by a second rod.

5. The multi-purpose grasping attachment of claim 4, wherein the jaw actuator assembly comprises a first hydraulic cylinder for selectively moving the pivotal jaw member between the open and closed positions and the grapple actuator comprises a second hydraulic cylinder for selectively moving the grapple between the open raised state and the closed lowered state.

6. The multi-purpose grasping attachment of claim 5, wherein the jaw actuator connection comprises at least one hydraulic hose and at least one hydraulic coupling connecting the or more hydraulic cylinder assemblies of the jaw actuator assembly to the utility tractor for operating and powering the jaw actuator assembly and further wherein the grapple actuator connection comprises at least one hydraulic hose and at least one hydraulic coupling connecting the grapple actuator to the utility tractor for operating and powering the grapple actuator.

7. The multi-purpose grasping attachment of claim 6, wherein the pivotal jaw member and the fixed jaw member comprise saw toothed inner grasping edges.

8. The multi-purpose grasping attachment of claim 1, wherein the grapple actuator comprises one of a hydraulic cylinder, a linear actuator, or a pneumatic actuator.

9. The multi-purpose grasping attachment of claim 1, wherein the grapple actuator is configured to move the grapple between an open state and a closed state.

10. The multi-purpose grasping attachment of claim 1, wherein the grapple of the accessory comprises a shield and a plurality of tines extending from the shield.

11. A multi-purpose grasping attachment and accessory for a utility tractor, comprising:
    a frame;
    at least one attachment section on the frame for attaching the frame to the utility tractor;
    a first jaw member pivotally mounted to the frame;
    a second jaw member fixedly attached to the frame and opposite the first jaw member;
    saw toothed inner grasping edges on the first jaw member and the second jaw member, wherein such edges are aligned to fit together when the jaw members are in the closed position;
    a jaw actuator assembly configured to move the first jaw member between open and closed positions;
    a jaw actuator connection comprising at least one hydraulic hose and at least one hydraulic coupling for connecting the jaw actuator assembly to the utility tractor for operating and powering the jaw actuator assembly;
    an accessory removably coupled to the frame of the multi-purpose grasping attachment, the accessory comprising:
    a cross-bar configured to be coupled to the frame;
    a grapple pivotally attached to the cross-bar, wherein the grapple comprises a plurality of tines, a first reinforcing bar, a second reinforcing bar, and a shield extending substantially the width of the cross-bar;
    a grapple actuator configured to move the grapple as it pivots between an open raised state and a closed lowered state;
    a grapple actuator connection comprising at least one hydraulic hose and at least one hydraulic coupling connecting the grapple actuator to the utility tractor for operating and powering the grapple actuator;

wherein the shield is positioned between the first reinforcing bar and the second reinforcing bar, and the plurality of tines are attached to the first reinforcing bar;

further wherein the grapple actuator is attached to the cross-bar and the first reinforcing bar; and said grapple movable between an open position wherein the grapple is a see-through shield and a closed position with decreased space between the grapple and the jaw members.

12. The multi-purpose grasping attachment of claim 11, wherein the multi-purpose grasping attachment and accessory are configured to grasp objects in the closed positions and release said objects in the open positions for lifting, pulling, holding, and transporting said objects to a new location.

13. The multi-purpose grasping attachment of claim 11, wherein the tines are configured to be removably attached to the first reinforcing bar.

14. The multi-purpose grasping attachment of claim 13, wherein the shield comprises a see-through member configured to provide safety and vision for an operator of the attachment.

15. The multi-purpose grasping attachment of claim 14, wherein the tines are oriented at an angle relative to the planar axis of the shield and extend generally away from the shield.

16. The multipurpose grasping attachment of claim 11, wherein the accessory is configured to rotate greater than 90° relative to the grasping attachment.

17. The multi-purpose grasping attachment of claim 11, wherein the accessory is configured to act as a cab guard when in the open raised state.

18. The method of claim 16, wherein the angle formed by the pivotal jaw member with the fixed jaw member in the open position is between 45-85°.

19. A method of removing trees, shrubs, or posts, comprising:
   providing a multi-purpose grasping attachment for a utility tractor, comprising:
   a) a frame;
   b) at least one attachment section on the frame for attaching the frame to loader arms of the utility tractor;
   c) a pivotal jaw member pivotally mounted to the frame;
   d) a fixed jaw member fixedly attached to the frame and opposite the pivotal jaw member, wherein the fixed jaw member is angled less than 90° relative to the frame; and
   e) a jaw actuator assembly configured to move the pivotal jaw member relative to the fixed jaw member between open and closed positions;
   providing an accessory for a multi-purpose grasping attachment, comprising:
   a) a cross-bar configured to be removably coupled to the frame;
   b) a grapple pivotally attached to the cross-bar, wherein the grapple comprises a plurality of tines and a shield; and
   c) a grapple actuator configured to move the grapple as it pivots between an open raised state and a closed lowered state;
   actuating the pivotal jaw member into an open position;
   actuating the accessory into an open raised state;
   moving the tractor to position a tree, shrub, or post between the jaw members in the open position, wherein the jaw members are positioned around the base of the tree, shrub, or post near or at the ground;
   actuating the pivotal jaw member into the closed position, wherein the jaw members close tightly upon and grasp the tree, shrub, or post;
   actuating the accessory into a closed lowered state;
   raising the attachment to remove the tree, shrub, or post from the ground;
   transporting the tree, shrub, or post to a desired location;
   actuating the accessory into the open raised state;
   actuating the pivotal jaw member into the open position to release the tree, shrub, or post.

20. The method of claim 18, wherein the utility tractor is a skid-steer loader.

* * * * *